Jan. 19, 1932. M. L. BENOIT 1,841,395
BOTTLE SUPPORT
Filed Dec. 4, 1929
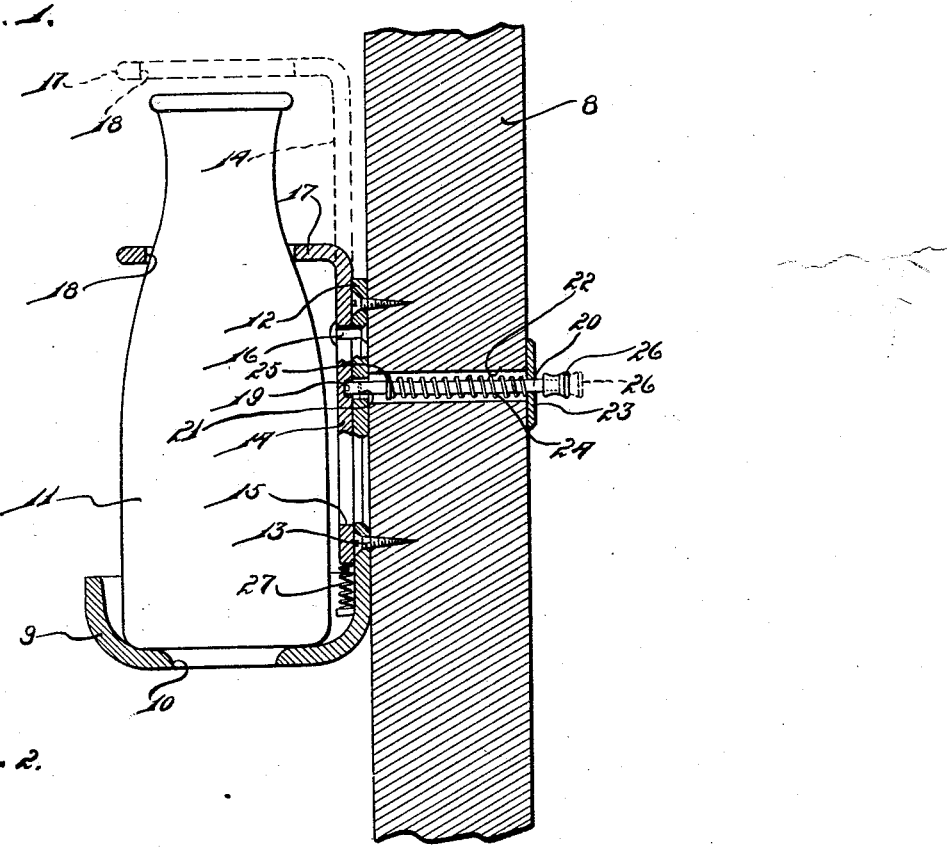
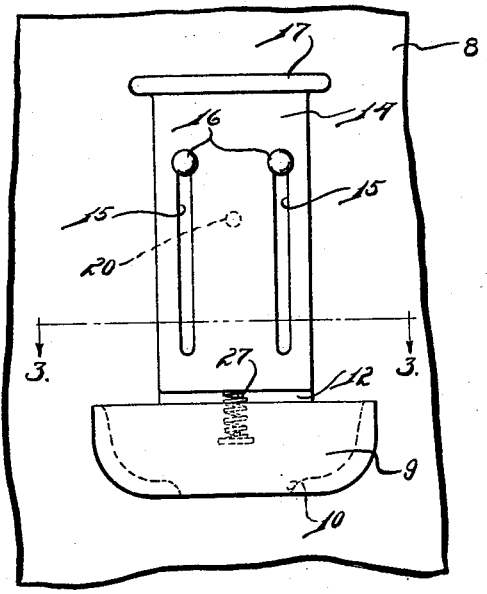
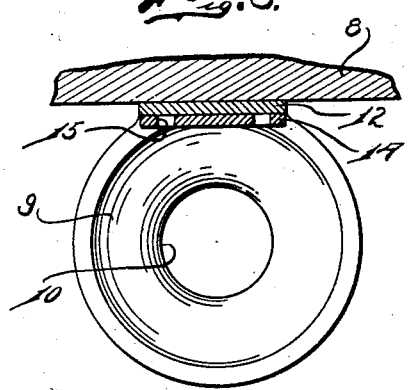
INVENTOR.
Mary L. Benoit.
BY Thos. Donnelly
ATTORNEY.

Patented Jan. 19, 1932

1,841,395

UNITED STATES PATENT OFFICE

MARY L. BENOIT, OF DETROIT, MICHIGAN

BOTTLE SUPPORT

Application filed December 4, 1929. Serial No. 411,613.

My invention relates to a new and useful improvement in a bottle support and has for its object the provision of a device which may serve to support and retain a bottle in position and prevent undue removal of the bottle therefrom.

Another object of the invention is the provision of means for locking the bottle in position in said support.

Another object of the invention is the provision of a device of this class which will be simple in structure, economical of manufacture, and highly efficient in use.

Other objects will appear hereinafter.

The invention consists in the combination and arrangement of parts hereinafter described and claimed.

The invention will be best understood by a reference to the accompanying drawings which form a part of this specification and in which, Fig. 1 is a central vertical sectional view of the invention.

Fig. 2 is a front elevational view of the invention.

Fig. 3 is a sectional view taken on line 3—3 of Fig. 2.

The invention is adapted for mounting and I have shown in the drawings the invention mounted upon a suitable support 8 which is preferably the wall of a building, one side thereof being accessible from the interior. The invention comprises a suitable cup shaped member 9 having an opening 10 formed in its base to prevent accumulation of water therein. The cup shaped member 9 is sufficiently large for receiving a milk bottle 11. A plate 12 projects upwardly from the cup shaped supporting member 9 and is secured by screws or other suitable fastening means 13 to the support 8. A plate 14 of substantially the same width as the plate 12 is provided with the elongated longitudinally extending slots 15 through which project rivets 16 which are secured to the plate 12 and provided with a head which will prevent the disassembling of the plates 12 and 14. The upper end of the plate 14 is angularly turned as at 17 to extend in a horizontal plate which projects over the cup shaped supporting member 9. This horizontal extending portion 17 is provided with an opening 18 sufficient to slip over the mouth of the bottle 11 and pull downwardly on the neck, the slots 15 being of such a length that the plate 14 may be moved to the position shown in dotted lines in Fig. 1. The bottle 11 may be placed on the cup shaped member 9 or removed therefrom. After the bottle 9 has been placed on the cup shaped member and the plate 14 moved downwardly until the opening 18 engages the periphery of the bottle 11 the notch 19 of the plate 14 will be brought into registration with the plunger 20 which projects through an opening 21 formed in the plate 12 and through the passage way 22 formed in the supporting structure 8 and through the retaining plate 23 which is mounted on the structure 8. Engaging the inner surface of the plate 23 is one end of a spring 24 the other end of which engages a collar 25 fixedly mounted on the plunger 20. The spring will then force the plunger 20 into the notch 19 and lock the plate 14 against vertical slidable movement thus preventing undue removal of the bottle from its support. A head 26 is mounted on the plunger 20 and when moved to the dotted line position shown in Fig. 1 the plunger will be disengaged from the recess or notch 19. Upon this engagement the spring 27 which engages the lower end of the plate 14 will force the plate upwardly a distance so that the notch or recess 19 is no longer in registration with the plunger 20. The person withdrawing the plunger from the interior of the building may then, from the interior of the building, raise the plate 14 to sufficient height for permitting the removal of the bottle from the cup shaped supporting member 9. With a device constructed in this manner there is provided an easy and effective means of preventing theft and there is also provided a simple and easily constructed device which may be quickly mounted in position.

While I have illustrated and described the preferred form of construction I do not wish to limit myself to the precise details of structure shown but desire to avail myself of such variations and modifications as may come within the scope of the appended claim.

Having thus described my invention what I claim as new and desire to secure by Letters Patent is:

A bottle support of the class described, comprising: a cup-shaped supporting member; a plate projected upwardly from said supporting member and provided with longitudinally slots and adapted for mounting on a supporting structure; a second plate engaging in overlapped relation said first mentioned plate and provided with elongated slots registering with the slots in said first mentioned plate; securing means projected through said slots for securing said plates together in slidable relation; means on said second plate for engaging a bottle and preventing its removal from said cup-shaped supporting member, upon movement of said second plate to a predetermined position relatively to said first plate, there being an opening formed in said first plate and said second plate having a notch formed in one of its faces and registering with said opening upon movement of said plates to said position; and a releasable member slidable through said opening into engagement with said notch for locking said plates against slidable movement.

In testimony whereof I have signed the foregoing specification.

MARY L. BENOIT.